United States Patent [19]

Irwin

[11] Patent Number: 5,108,134
[45] Date of Patent: Apr. 28, 1992

[54] PIPE CONNECTIONS

[76] Inventor: William J. Irwin, 799 Feeny Road, Dungiven, County Londonderry, BT47 4TA, Northern Ireland

[21] Appl. No.: 382,662
[22] PCT Filed: Oct. 12, 1988
[86] PCT No.: PCT/GB88/00858
  § 371 Date: Aug. 10, 1989
  § 102(e) Date: Aug. 10, 1989
[87] PCT Pub. No.: WO89/03494
  PCT Pub. Date: Apr. 20, 1989
[51] Int. Cl.⁵ .............................. F16L 41/00
[52] U.S. Cl. ..................... 285/156; 285/382.7
[58] Field of Search ............ 285/382, 382.1, 382.2, 285/382.7, 156

[56] References Cited

U.S. PATENT DOCUMENTS

| 347,947 | 8/1886 | Miles | 285/382 X |
|---|---|---|---|
| 1,042,262 | 8/1977 | Mooney et al. | 285/382 X |
| 3,149,861 | 9/1964 | Larsson | 285/382.2 X |
| 3,632,141 | 1/1972 | Larsson | 285/382.7 X |
| 3,675,949 | 7/1972 | Dawson | 285/382.2 X |
| 4,103,937 | 8/1978 | Wakefield | |
| 4,850,096 | 1/1989 | Gotoh et al. | 285/382.7 X |

FOREIGN PATENT DOCUMENTS

| 1945362 | 3/1970 | Fed. Rep. of Germany . | |
| 410268 | 4/1947 | Italy | 285/382 |
| 6748 | 3/1970 | Japan | 285/382.7 |
| 511527 | 9/1939 | United Kingdom . | |

*Primary Examiner*—Dave W. Arola
*Attorney, Agent, or Firm*—Armstrong, Nikaido, Marmelstein, Kubovcik & Murray

[57] ABSTRACT

A method of and means for making pipe-to-pipe connections in which the pipes are provided with socket ends and with spigot ends for mating with the socket ends of pipes to be connected therewith. Each socket end being provided with an annular portion of increased diameter. The socket ends are of malleable material capable of being crimped around a spigot end of the mated pipe. An annular element is provided within the pipe connection. The annular element is positioned in the inside of the annular portion.

15 Claims, 3 Drawing Sheets

PIPE CONNECTIONS

This invention relates to pipe connections of a type not requiring the use of solder or other flowable sealant and not requiring the use of flux.

Heretofore, there have been two types of pipe connections, known as capilliary joints and as compression joints. The capilliary joint is made by heating a close fitting pipe connection between two pipes, the connection containing an internal ring of solder, whereby the solder, which is a lead alloy, melts and flows between the wall interstices thereafter cooling to solidify and make a fluid-tight connection. The forming of this type of connection has disadvantages in that it requires heat, normally in the form of a blow lamp or torch, to melt the solder. This operation is a fire hazard. Also, the solder since it contains lead has health hazards. Further, to make the connection, it is necessary to use flux which is corrosive to metal and damaging to the hands of the user, and if the flux is not fully used up during the heating process, it remains in the connection and, like the solder, has health hazards. A pre-requisite for the success of this type of connection is that the wall surfaces at the interstices are to be clean, and no water has to be flowing in the pipe. The compression joint consists of a ring or olive of brass or copper being compressed between a threaded part of a connection housing and a compression nut which shrouds the threaded part of the housing. Under compression the olive which can have a chamfered cross-section, deforms to bite into the pipe so that a fluid-tight connection is formed. This connection while it has not the disadvantages of the capilliary joint does have its own disadvantages which have in fact caused the capilliary joint, despite its disadvantages, to become the more popular and widely used. The disadvantages of the compression joint are ones of costs to produce and labour costs to fit, apart from the fact that it is bulkier and therefore more noticable than the capilliary joint. Also, there is the problem that, at least for domestic requirements, the pipes to be aesthetically pleasing have to be fitted near to walls or in corners. This means that there is limited access for a spanner or like tool to turn the nuts onto the threaded parts of the housings, and therefore it takes longer to tighten and form each connection.

An object of the present invention is to provide means to make pipe connections which obviate or mitigate the aforesaid disadvantages.

Accordingly, a first aspect of the present invention is a method of connecting two pipes together in end-to-end relationship comprising forming one pipe with a socket end and the other pipe with a spigot end, the socket end being provided with an annular portion of increased diameter and being of a malleable material, providing an annular element in the connection between the two mated pipes and crimping the socket end around the element and the spigot end to form a fluid-tight connection.

Also accordingly, a second aspect of the present invention is means to make pipe-to-pipe connections comprising a pipe for use with others of its kind, the pipe having a socket end to receive a spigot end of the pipe to be connected therewith, the socket end being provided with an annular portion of increased diameter and being of a malleable material capable of being crimped around said spigot end of the mated pipe, there being an annular element provided within the connection.

Further accordingly, a third aspect of the present invention is a pipe assembly formed from a plurality of pipes fitted in end-to-end relationship with means to make pipe-to-pipe connections each comprising a pipe being provided with a socket end to receive a spigot end of the pipe to be connected therewith, the socket end being provided with an annular portion of increased diameter and being of a malleable material capable of being crimped around the spigot end of the mated pipe, there being an annular element of complementary shape provided within the connection to seat inside of the annular portion of the socket, each socket end being crimped around and to said complementarily shaped annular element of the respective mated spigot end.

Preferably, the annular portion of each socket end is of convex cross-section and the top surface of the annular element is of complementary convex crosssection.

Preferably also, the annular element is a complementarily shaped annular portion provided on the spigot end of the respective pipe. The annular portion of each spigot end is preferably formed of an annulus tight-fitted thereover. Alternatively, the portion of complementary shape is swaged in the spigot end of the pipe.

Alternatively, the annular element is an annulus located internally within the annular portion of each socket end, the socket end being adapted to hold the annulus in said position.

The annulus is preferably made of metal or of natural or synthetic rubber.

Preferably further, in the case of a metal annulus, one or two compressible rings are provided between the portions of the spigot and socket ends in each pipe connection. The one ring may preferably be seated at or adjacent to the outer end of the annular element, and the two rings may preferably be seated at or adjacent to the outer and inner ends of the annular element. Alternatively, the one ring may be seated in or adjacent to the portion of the socket end. The ring may preferably be of compressible natural or synthetic rubber material and may suitably be an O-ring.

Further accordingly, a fourth aspect of the present invention is a pipe assembly formed from fitting alternately a plurality of pipe lengths each having both ends formed as spigot ends, and a plurality of short pipes forming connectors, both ends of each connector having a socket end with an annular portion of increased diameter, the socket ends being of a malleable material capable of being crimped around a spigot end of a mated pipe length, there being an annular element of complementary shape provided within each connection to seat inside the annular portion of the socket end with each socket end being crimped around and to said complementarily shaped annular element of the respective mated spigot end.

A fifth aspect of the present invention is a pipe connector for use in connecting two or more pipe lengths together in end-to-end relationship in which a socket end is provided at each end, each socket end having an annular portion of increased diameter and being of a malleable material capable of being crimped around a spigot end of a pipe length when fitted thereinto. The connectors may preferably be of any desired shape such as straights, curves, or T-pieces.

The annulus is preferably an olive in which a series of cuts are made inwardly from one edge of the olive. The cuts are preferably V-shape and extend towards the opposite edge. The outer surface of the edge in which the cuts are provided is preferably pared or tapered towards the inner surface. The inside surface of the olive is preferably provided with one or more peripheral gripping elements. The elements each preferably extend inwardly raised above a surrounding area of the inside surface and preferably has a sloped face and sharp front. The cuts preferably impinge into and through the or at least one of the gripping elements. The olive is preferably formed from a pre-cut length of a strip of material to be formed into the olive shape prior to being positioned in the annular portion of a respective socket end.

Embodiments of the present invention will now be described, by way of example, with reference to the accompanying diagrammatic drawings, in which.

Figure 1:
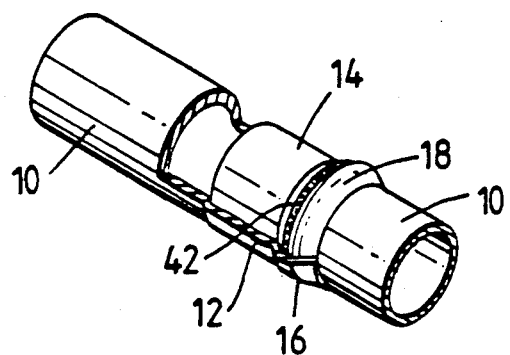
FIG. 1 is a perspective view of a pipe connection according to a first embodiment of the present invention between a socket end and a spigot end of two mated pipes, part of the socket end being cutaway for clarity.
Figure 2:
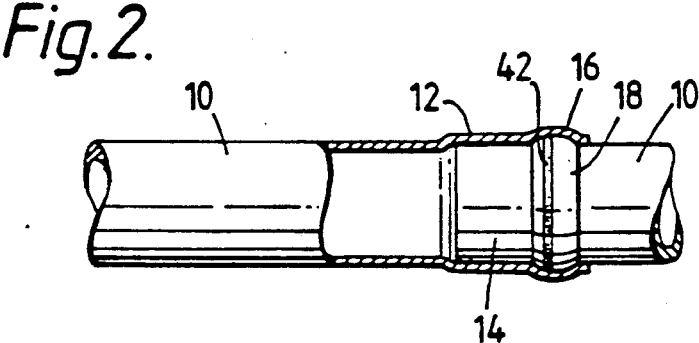
FIG. 2 is a plan view of the pipe connection shown in FIG. 1.

Referring to FIGS. 1 and 2 of the drawings, in a first embodiment a pipe 10 of malleable material is provided with a socket end 12 and a spigot end 14, the socket end 12 being swaged to receive the spigot end 14 of a mating pipe in end-to-end relationship.

The term 'swaged' is used herein and in the claims to include the process of increasing in diameter an annular portion of an end of a pipe or pipe connector by mechanical means or by the increase being formed as part of a casting.

The socket end 12 has a portion 16 of increased diameter and the spigot end 14 has a complementary shaped portion 18. The portion 16 of increased diameter is of annular convex section and the outer surface of portion 18 is of annular complementary convex section. The portion 18 is desirably formed of an annulus in the form of an olive fitted over the spigot end 14 of each pipe 10.

In use, a pipe assembly is formed from a plurality of pipes 10 fitted in end-to-end relationship with the portion 18 of each spigot end 14 seating inside the portion 16 of the socket end 12 of a mated pipe. The outer end of the portion 16 of each socket end is then crimped around said portion 18 of each mated spigot end 14 to form a fluid-tight connection.

In a modification, the portion 18 is swaged in the spigot end of each pipe 10.

Figure 3:
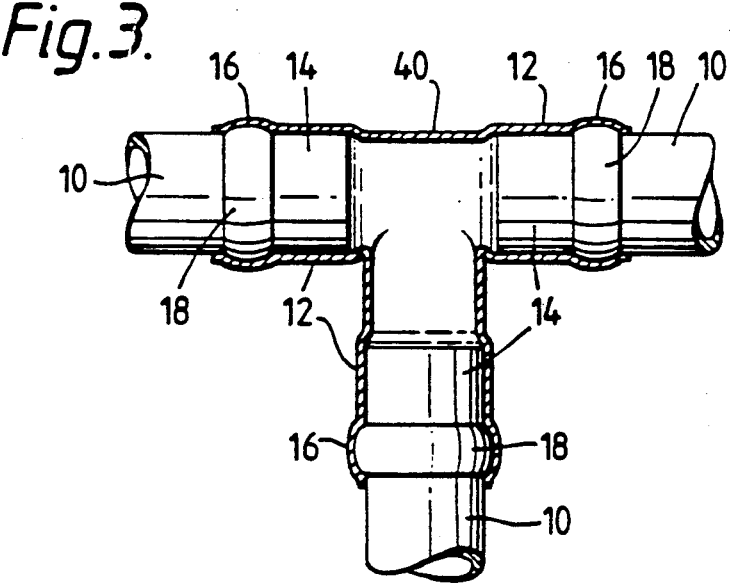
FIG. 3 is a cross-sectional view of a pipe connection according to a second embodiment, showing three pipes connected together by a connector.
Figure 4:
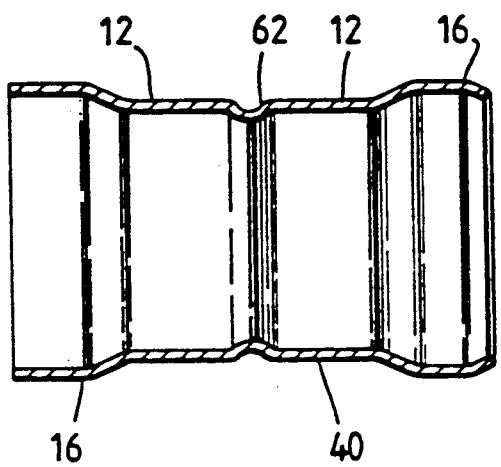
FIG. 4 is a cross-sectional view of a connector to a larger scale showing both ends formed as socket ends with one partly crimped to hold an annular element in position, the element not being shown.
Figure 5:
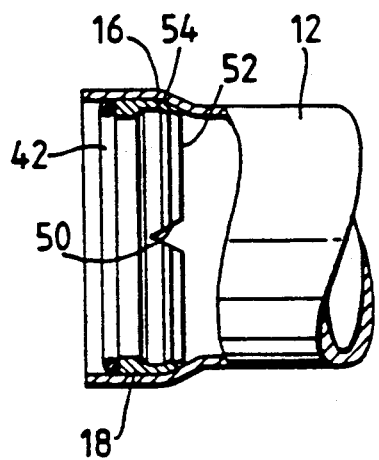
FIG. 5 is a detail of one socket end shown in FIG. 4 with part cut-away to reveal an annular element and a compressible ring in position.

Referring to FIGS. 3, 4 and 5, a second embodiment is shown in which a pipe connector 40 of malleable material is used to connect three pipes 10. The pipe connector 40 as shown in FIG. 3 is a T-piece, but could be a straight piece as shown in FIGS. 4 and 5, or a curve (or corner or knuckle) piece to connect two lengths of pipe. The connector 40 has three ends, each fashioned as a socket end 12. Each socket end 12 is provided with an annular portion 16 of increased diameter and internally concave. The spigot end 14 of each pipe 10 has a corresponding annular portion of increased diameter and externally complementary convex to mate with a portion 16.

In use, the pipe assembly is fitted together using one T-piece connector 40 and the three pipes 10 with each end to be mated fitted with an annulus or olive 18. After being mated, the connections are crimped to form fluid-tight connections.

In a preferred modification of this second embodiment, the connectors are provided with an annulus 18 of metal already fitted internally into each annular portion 16 of a socket end. In this modification, each end of a pipe length 10 can be fitted into a socket end of the connector 40 without first having to have an annulus fitted or a portion swaged into it. The outer end of the portion 16 of each socket end is partially crimped circumferentially or radially or rolled to hold the annulus 18 therein while not impeding entry of a spigot end of a pipe length 10. Alternatively, the annulus 18 is otherwise secured in the annular portion 16, for example by adhesion. In this modification, the pipe lengths may be of rigid plastics material and can be of flexible plastics material provided that liner collars are fitted into the spigot ends to lend support during crimping and to maintain the crimped position thereafter.

In each of the above embodiments, a compressible ring 42 can be provided to seat between the portions 16, 18 when fitted together. The ring 42, which is a rubber O-ring, is shown in FIGS. 1 and 2 seated in a groove provided in the outer surface of annular portion 18. The ring 42 need not be so positioned and can be positioned in front of (as shown in FIG.5) or leading the portion 18 in the direction of the pipe being mated or at the rear or trailing the portion 18. Two rings 42 ca be provided one at the front edge and one at the trailing edge of the annular portion 18. Also in the alternative, the ring 42 can be seated in the portion 16. The ring 42 can be of a natural or synthetic rubber material, and may be of a shape other than an O-ring.

Figure 6:
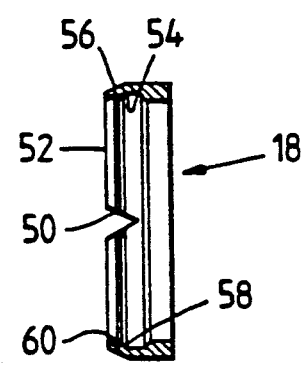
FIG. 6 is a cross-sectional view of an annular element to a larger scale.
Figure 7:
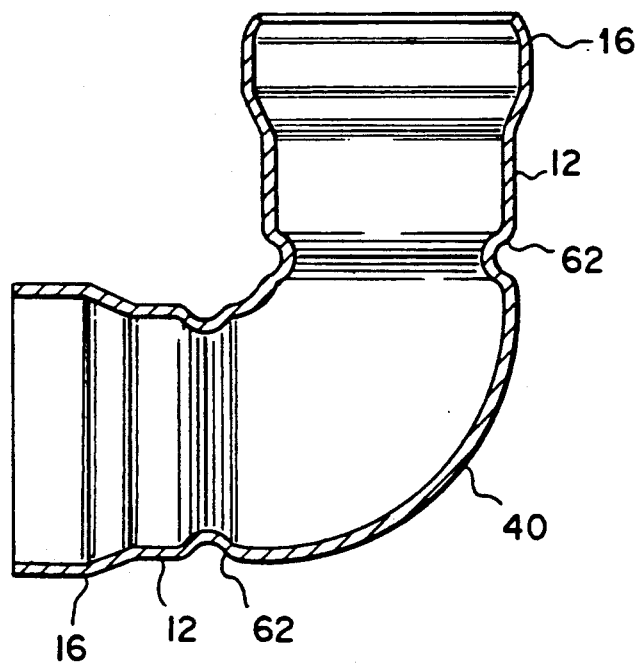
FIG. 7 is a cross-sectional view of a pipe connector having a curved configuration.

Referring to FIG. 6, the olive 18 of metal is provided with a series of cuts 50 which are made in one edge thereof. The cuts 50 are V-shape and converge into a slot shape towards the opposite edge as shown. The outer surface 52 of the edge in which the cuts 50 are provided is pared to taper towards the inner surface as shown. The number and dimensions of the cuts 50 in the series may vary from, for example three to eight, four being cut in the olive shown in FIG. 6. The inside surface 54 of the olive is provided with one or more peripheral gripping elements 56 (one only being shown). Each element 56 extends inwardly raised above a surrounding area of the inside surface 54 and has a sloped face 58 and a sharp front 60. The cuts 50 impinge into and through the elements 56 as shown.

In use, the edge-cut annulus 18 above-described is advantageous since it requires a minimum amount of force to crimp the socket end of a pipe connector compared to a non-cut annulus. The annulus can be located in the portion 16 with the cuts 50 facing towards or away from the open socket end.

The olive 18 may be formed from a pre-cut length of strip material having a formation on one side to serve as a gripping element and being provided with cuts above described extending from one side towards the other side.

The socket ends of a connector 40 may be of the same or of different diameters.

Any suitable means for crimping the outer end of portion 16 of a socket end 12 can be used and desirably can be of the type described and shown in my UK Patent Application No. 8815643.5.

In a first modification, as shown in FIG. 4, a peripheral groove 62 or a series of dimples may be provided around the connector 40 to serve as an internal limit against which the spigot ends of pipe lengths 10 can abut.

In a second modification, the annular element 18 may be a compressible annulus of natural or synthetic rubber, for example an O-ring.

In a third modification, the pipes can be two tubular elements to be fitted in end-to-end relationship, the tubular elements not being intended to convey any fluid.

In a fourth modification, the gripping elements may not extend in a continuous peripheral manner around the inside of the olive but may be in one or more radial parts peripherally around the inside of the olive.

Variations and other modifications can be made without departing from the scope of the invention above described.

I claim:

1. Means to make pipe-to-pipe connections between a first pipe and a second pipe comprising:
    a first pipe having formed at an end thereof a socket of increased diameter and composed of a malleable material; and
    an annulus of malleable material having an outer diameter fitting to an inner diameter of said pipe socket end, and an inner diameter to accomodate a spigot end of a second pipe inserted therewithin, said annulus being formed on an inside surface at a peripheral edge thereof with at least one gripping element;
    wherein said annulus peripheral edge has a sharp front pared to taper toward the inside surface and is formed with a plurality of cuts therein so as to reduce force necessary to crimp said annulus edge to grip said second pipe inserted therewithin; and
    wherein said first pipe malleable socket end and said inside surface of said annulus and said malleable annulus edge are crimpable to form a fluid-tight and gripping connection, respectively, with said spigot end of said second pipe inserted into said annulus within said first pipe in an assembled state.

2. A means as recited in claim 1 wherein said annulus is positioned within said first pipe socket end and retained therein by a crimped portion of said socket end.

3. A means as recited in claim 1, wherein said annulus is affixed to said second pipe spigot end.

4. A means as recited in claim 1 wherein said first pipe and said annulus are formed of metal.

5. A means as recited in claim 1 further including a ring of compressible material positioned adjacent said annulus within said socket end in the assembled state.

6. Means to make pipe-to-pipe connections as recited in claim 1 wherein said first pipe is a straight pipe having a socket end at each end.

7. Means to made pipe-to-pipe connections as recited in claim 1 wherein said first pipe is a curved pipe having a socket end at each end.

8. Means to make pipe-to-pipe connections as recited in claim 1 wherein said first pipe is a T-piece having a socket end at each end.

9. A pipe assembly formed of a plurality of pipe-to-pipe connections means as recited in claim 1, wherein each pipe includes a spigot end and a socket end.

10. A pipe assembly formed by a plurality of pipe-to-pipe connection means as recited in claim 1, wherein at least one said first pipe of said assembly is formed with a socket end at each end.

11. A pipe assembly as recited in claim 10, wherein said at least one first pipe is a T-piece.

12. The method of connecting two pipes together in end-to-end relationship comprising the steps of:
    (a) swaging a first pipe end composed of malleable material to form a socket end of increased diameter;
    (b) forming an annulus of malleable material having an inside surface, and having an outer diameter fitting to an inner diameter of said first pipe swaged socket end and an inner diameter to fit a spigot end of a second pipe, to have a peripheral edge extending from said inside surface with a gripping element at an inside surface thereof, a taper toward the inside surface and a plurality of cuts in said peripheral edge;
    (c) assembling said first pipe, said annulus and said second pipe so that a spigot end of said second pipe is fitted into said annulus and positioned within said first pipe socket end; and
    (d) crimping said socket end of said first pipe around said annulus and second pipe to form fluid-tight connection therewith, force of said crimping also serving to crimp said annulus inside surface and peripheral edge to form fluid-tight and gripping contact, respectively, with said second pipe.

13. The method of connecting two pipes as recited in claim 12, wherein the assembling step comprises:
    first assembling said annulus to said first pipe by inserting the annulus into said socket end and crimping a portion of said socket end so as to retain said annulus therein; and
    thereafter, inserting said second pipe into said annulus within said first pipe socket end prior to performing said crimping step.

14. The method of connecting two pipes as recited in claim 12 wherein the assembling step comprises:
    first fitting said annulus to the spigot end of said second pipe; and
    thereafter, inserting said spigot end and said annulus into said first pipe socket end prior to performing said crimping step.

15. The method recited in claim 12, 13 or 14 further comprising the step of providing an annular element of compressible material adjacent said annulus within said socket end prior to said crimping step.

* * * * *

UNITED STATES PATENT AND TRADEMARK OFFICE
CERTIFICATE OF CORRECTION

PATENT NO. : 5,108,134
DATED : April 28, 1992
INVENTOR(S) : IRWIN

It is certified that error appears in the above-identified patent and that said Letters Patent is hereby corrected as shown below:

At column 4, line 39, the word "ca" should read --can--;

Column 6, claim 7, line 1, the word "made" should read --make--.

Signed and Sealed this

Ninth Day of November, 1993

*Attest:*

BRUCE LEHMAN

*Attesting Officer*   *Commissioner of Patents and Trademarks*